US005798932A

United States Patent [19]

Premerlani et al.

[11] Patent Number: 5,798,932
[45] Date of Patent: Aug. 25, 1998

[54] METHODS AND APPARATUS FOR REMOVING ERROR DUE TO DECAYING OFFSETS FROM MEASURED POWER SYSTEM CURRENTS

[75] Inventors: William James Premerlani, Scotia, N.Y.; Mark Gerard Adamiak, Paoli, Pa.; Dingari Sreenivas; Eyyunni Venugopal, both of Wayne, Pa.

[73] Assignee: General Electric Company, Schenectady, N.Y.

[21] Appl. No.: 651,178

[22] Filed: May 21, 1996

[51] Int. Cl.⁶ .................... G01R 31/08; H02H 3/38
[52] U.S. Cl. .................. 364/483; 364/481; 364/482; 364/487; 364/492; 364/550; 361/78; 361/79; 361/80; 361/85; 361/42; 324/76.11; 324/107; 324/140 R; 324/512; 324/520; 324/521; 324/522
[58] Field of Search .................. 364/481-483, 364/487, 492, 550; 361/78-80, 85, 42; 324/76.11, 76.12, 76.21, 107, 140 R, 141, 500, 509, 512, 520, 521-522

[56] References Cited

U.S. PATENT DOCUMENTS

| | | | |
|---|---|---|---|
| 4,455,612 | 6/1984 | Girgis et al. | 364/483 |
| 4,577,279 | 3/1986 | Salowe | 364/483 |
| 4,795,983 | 1/1989 | Crockett et al. | 324/521 |
| 4,972,290 | 11/1990 | Sun et al. | 361/64 |
| 5,072,403 | 12/1991 | Johns | 364/492 |
| 5,105,352 | 4/1992 | Iwasa et al. | 363/98 |
| 5,406,495 | 4/1995 | Hill | 364/483 |
| 5,428,549 | 6/1995 | Chen | 364/483 |
| 5,453,903 | 9/1995 | Chow | 361/79 |
| 5,455,776 | 10/1995 | Novosel | 364/492 |
| 5,493,228 | 2/1996 | Eriksson et al. | 324/522 |

FOREIGN PATENT DOCUMENTS 1503335   3/1978   United Kingdom.

OTHER PUBLICATIONS

Gabriel Benmouyal, "Removal of DC–Offset In Current Waveforms Using Digital Mimic Filtering". IEEE Transactions on Power Delivery, vol. 10, No. 2, Apr. 1995, pp. 621–630.

Primary Examiner—Emanuel Todd Voeltz
Assistant Examiner—Tuan Q. Dam
Attorney, Agent, or Firm—Marvin Snyder; Douglas E. Stoner

[57] ABSTRACT

A digital decaying current offset correction method and apparatus, in one aspect, separates the requirements of detecting fault existence from the requirements of detecting fault location. Once the decaying offset removal routine is initiated, current and voltage are sampled and, for each current and voltage sample, current and voltage phasors are generated. The current phasor values, which are not offset corrected, may be used to determine whether to trip a breaker. Once the breaker is tripped, the decaying offsets are removed from the current phasors. The offset corrected current phasors are then used to locate the fault.

2 Claims, 3 Drawing Sheets

METHODS AND APPARATUS FOR REMOVING ERROR DUE TO DECAYING OFFSETS FROM MEASURED POWER SYSTEM CURRENTS

FIELD OF THE INVENTION

This invention relates generally to power systems and, more particularly, to determining fundamental power line currents.

BACKGROUND OF THE INVENTION

When monitoring a power system to detect system faults, protection equipment typically is configured to perform a number of diagnostic, or monitoring, routines. One such routine includes determining whether the fundamental current frequency components are within an acceptable range, or envelope. More specifically, the protection equipment is configured to periodically determine the fundamental power system frequency component of power system current signals for each phase. Once the current signal fundamental frequency component is determined for each phase, each component is compared to a preselected desired envelope. If the determined fundamental component is within the envelope, then the subject diagnostic test is passed. If, however, the fundamental component is not within the envelope, such condition may be indicative of a potential fault or other problem. If such condition persists, the protection equipment may operate to open the circuit associated with the out-of-range component. Once the circuit is opened, a utility worker typically must locate and correct the root cause of the out-of-range current component, and then close the circuit-breaking mechanism in the protection equipment.

In order to accurately identify the location of a fault, for example, the fundamental current component is analyzed to determine the distance from the protection equipment to the fault. In performing such analysis, it is desirable to remove decaying offsets from the current signal fundamental power system frequency component to improve accuracy. Decaying offsets usually occur in line currents during power system transients and are caused by the response of inductive and resistive impedances. The correction for such decaying offset must compensate for the time varying nature of the offset. Once the decaying offset has been removed, the current signal fundamental frequency component can be analyzed to facilitate locating the fault.

Prior to use of digital technology in protection equipment, an analog mimic was used to recover the voltage signal across the inductive impedance. Such voltage signal has no offset. The recovered voltage signal is then used for further processing in place of the current signal. Although such decaying offset removal typically is necessary only in certain applications, e.g., fault location, it is common practice to remove such decaying offsets for each current sample obtained regardless of whether such offset removal is necessary for the particular application.

When digital technology became available and used in protection equipment, the mimic method was still used for removing the decaying offset. More specifically, and in one known algorithm, each time new current and voltage data samples are obtained, a value designated $IX_m$ is determined for the sample. Specifically, the value $IX_m$ is determined in accordance with the following relationship:

$$IX_m = \frac{R}{\cos\left(\frac{\pi \cdot M}{N}\right)} \cdot \frac{(i_m + i_{m-M})}{2} + \frac{X}{\sin\left(\frac{\pi \cdot M}{N}\right)} \cdot \frac{(i_m + i_{m-M})}{2} \quad (1)$$

where:
- $IX_m$ = mth sample of the output of the mimic algorithm;
- $i_m$ = mth current sample;
- m = sample index, starting from 1, at N samples per cycle;
- M = interval, in samples, used to approximate the mimic simulation;
- N = sampling rate, samples per cycle;
- X = reactance of the mimic; and
- R = resistance of the mimic.

Relationship (1) is a digital approximation of the analog mimic circuit, which produces an output signal that is the sum of two terms. Specifically, the first term of relationship (1) is proportional to the product of the mimic resistance and the line current. The second term of relationship (1) is proportional to the product of the mimic reactance and the time derivative of the line current.

In addition to determining the value $IX_m$, the voltage sample is adjusted so that the adjusted voltage sample $v'_m$ has the same time basis as the current sample. Such adjustment is made in accordance with the following relationship:

$$v'_m = \frac{1}{\cos\left(\frac{\pi \cdot M}{N}\right)} \cdot \frac{(v_m + v_{m-M})}{2} \quad (2)$$

where:
- $v_m$ = mth voltage sample; and
- $v'_m$ = mth compensated voltage sample.

Using the values $IX_m$ and $v'_m$, power system parameters such as the fundamental power system frequency components are determined. Generally, a discrete fourier transform (DFT) is used to determine the fundamental power system frequency component and harmonics of each line current.

The known decaying offset correction method described above is computationally burdensome. Specifically, and to determine the required values using discrete fourier transforms in the sequence described above, 2N multiplications and 2N additions per cycle per channel, i.e., for each complete phasor rotation, are performed. The extensive computations required reduces the processor time available for performing other diagnostic tests.

It would be desirable, of course, to reduce the number of computations required in at least some circumstances to perform decaying offset correction so that the processor is available to perform other diagnostic tests. Performing offset correction using such reduced computations, however, should not result in any less optimum operation of the power distribution equipment than achieved by the known equipment.

SUMMARY OF THE INVENTION

A digital decaying current offset correction algorithm, in one aspect of the invention, separates the requirements of detecting fault existence from the requirements of fault location. More specifically, and in accordance with one embodiment of the invention, the decaying offsets do not necessarily have to be removed from the current phasors in order to determine whether a fault exists in the network. The decaying offsets need only be removed when using the phasors to locate the fault. By reversing the order of process steps executed so that phasor values are generated and then, when needed, removing decaying offsets from the generated phasor values, the computational burden can be significantly reduced in certain applications.

More specifically, and in accordance with one embodiment of the present invention, once the routine is initiated, and for each current and voltage sample, current and voltage phasors are generated. The current phasor values, which are not offset corrected, are then used to determine whether to trip a breaker, for example. Once the breaker trips, the decaying offsets are removed from the current phasors. The offset corrected current phasors are then used to locate the fault.

The invention thus reduces the number of computations required in at least some circumstances to perform decaying offset correction so that the controller processor is available to perform other diagnostic tests. In addition, performing such reduced number of computations is not believed to result in any less optimum operation of the power distribution equipment than achieved by the known equipment.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE DRAWINGS

Figure 1:
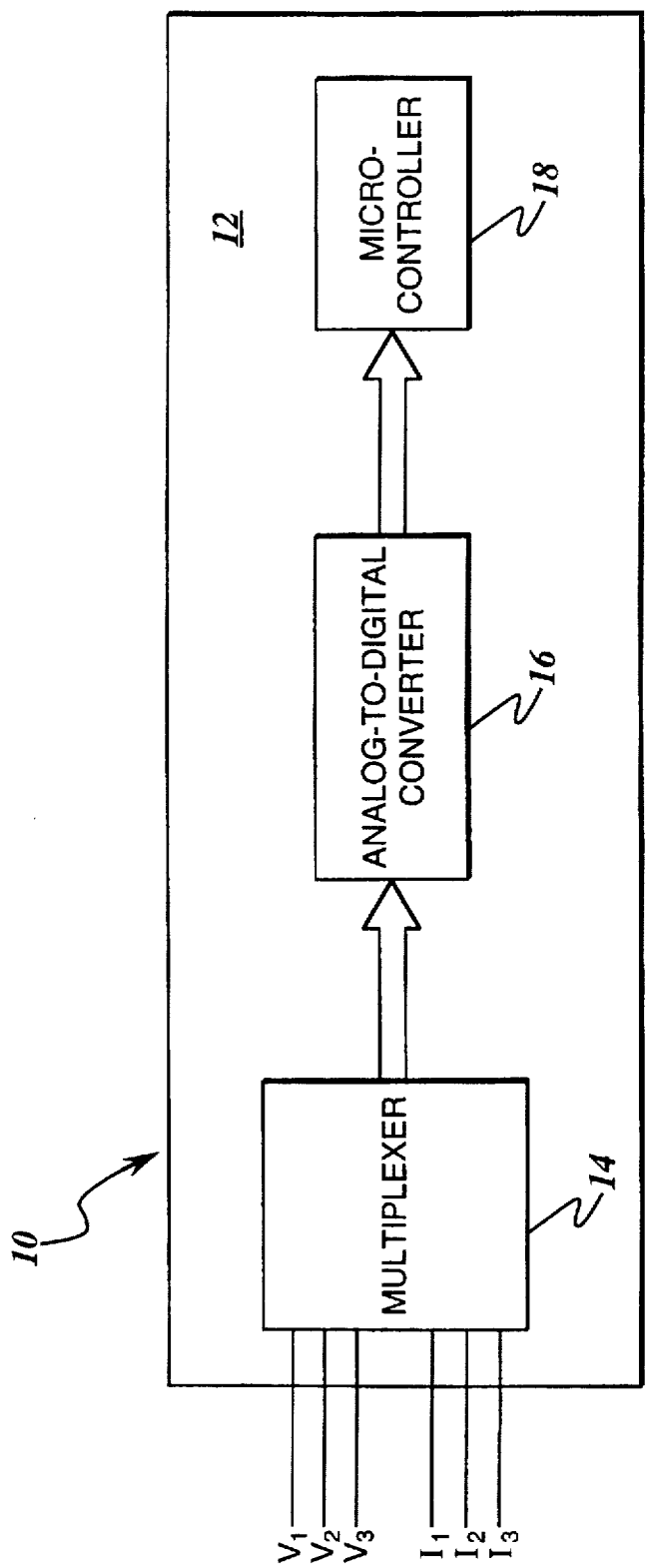
FIG. 1 is a block diagram illustrating a typical power distribution controller.

FIG. 1 is a block diagram illustrating a typical power distribution controller 10. Controller 10 includes a microprocessor 12, which may be implemented as an application specific integrated circuit (ASIC). Microprocessor 12 includes a multiplexer 14, an analog-to-digital converter 16 and a microcontroller 18. Multiplexer 14 includes six inputs, illustrated as receiving voltage signals $V_1$, $V_2$ and $V_3$ and current signals $I_1$, $I_2$ and $I_3$, respectively. Voltage signals $V_1$, $V_2$ and $V_3$ and current signals $I_1$, $I_2$ and $I_3$ are supplied, for example, from a multi-phase power distribution network.

Multiplexer 14 supplies a multiplexed analog signal to converter 16 which converts the input analog signals to digital signals. The digital signals produced by converter 16 are provided to microcontroller 18. Various operations are executed by microcontroller 18 using the digital signals received from converter 16. For example, and in one embodiment, microcontroller 18 analyzes current signals $I_1$, $I_2$ and $I_3$ to determine whether a fault exists on the power distribution network, and if microcontroller 18 determines that such a fault does exist, the microcontroller generates a signal which causes a circuit breaker (not shown) to trip, thereby removing power from the portion of the network where the fault is likely to be found.

Controller 10 is illustrated by way of example only to show one environment in which embodiments of the present invention can be practiced. Those skilled in the art will appreciate that the invention is not limited to practice in controller 10 and that the invention can be practiced in other processing environments.

Figure 2:
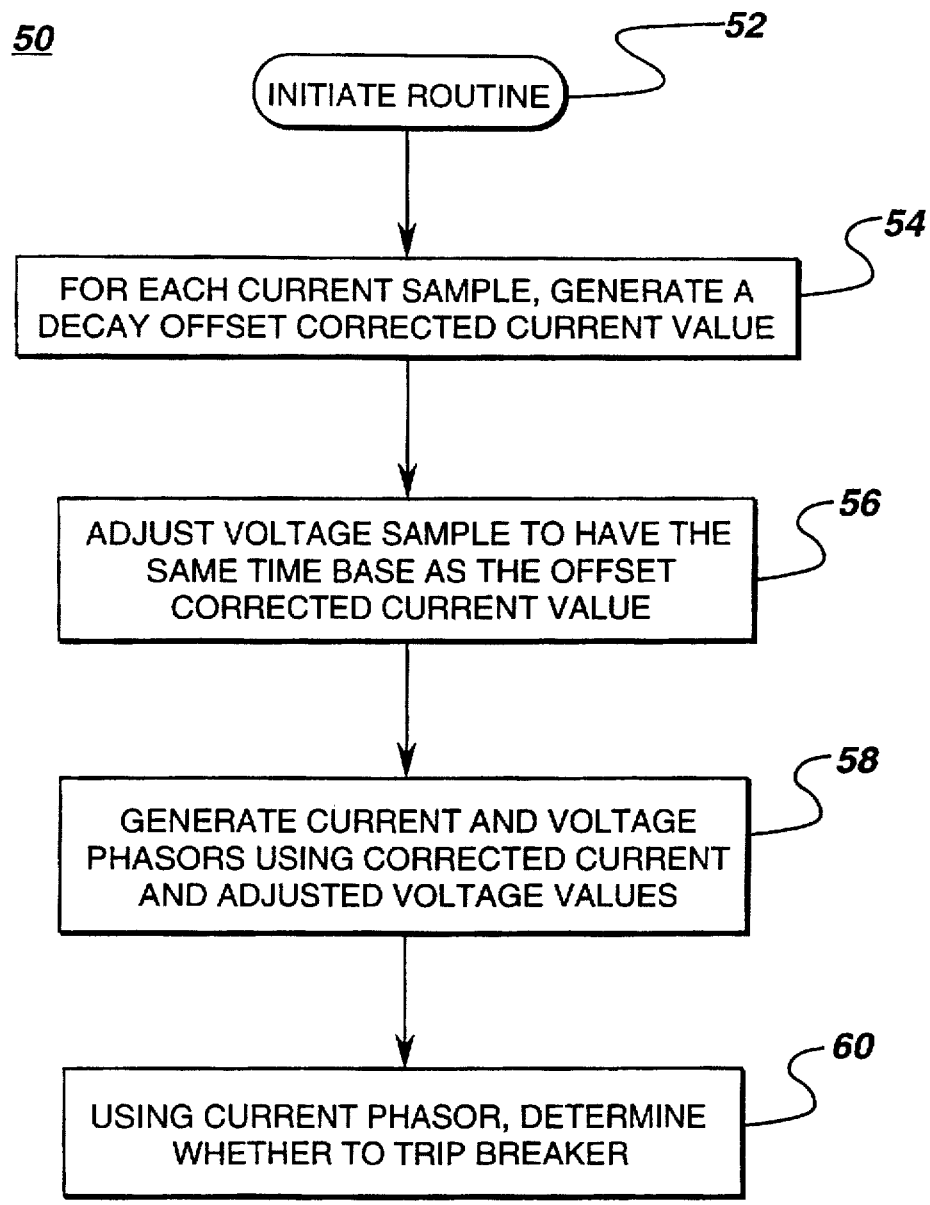
FIG. 2 is a flow chart illustrating a known decaying offset removal routine.

FIG. 2 illustrates one known routine 50 used in determining whether a fault exists on the power network. Generally, and in accordance with routine 50, controller 10 (FIG. 1) is configured to periodically determine the fundamental power system frequency component of the power system current signals for each phase. Routine 50 may, for example, be embedded in the firmware of microcontroller 18 (FIG. 1). Once the current signal fundamental frequency component is determined for each phase, each component is compared to a preselected desired envelope. If the determined fundamental component is within the envelope, then the subject diagnostic test is passed. If, however, the fundamental component is not within the envelope, such condition may be indicative of a potential fault or other problem.

Once routine 50 is initiated at step 52, for each new current data sample, an offset corrected current value is generated at step 54. A value designated as $IX_m$ is the offset corrected current value. The value $IX_m$ is determined in accordance with the following relationship:

$$IX_m = A \cdot i_m + B \cdot i_{m-M} \tag{3}$$

where:

$IX_m$ = mth sample of the output of the mimic algorithm;

$i_m$ = mth current sample;

m = sample index, starting from 1, at N samples per cycle;

M = interval, in samples, used to approximate the mimic simulation;

N = sampling rate, samples per cycle;

X = reactance of the mimic;

R = resistance of the mimic;

$$A = \frac{R}{2\cos\left(\frac{\pi M}{N}\right)} + \frac{X}{2\sin\left(\frac{\pi M}{N}\right)}$$

and $$B = \frac{R}{2\cos\left(\frac{\pi M}{N}\right)} - \frac{X}{2\sin\left(\frac{\pi M}{N}\right)}$$

The first term of relationship (3) is proportional to the product of the mimic resistance and the line current. The second term of relationship (3) is proportional to the product of the mimic reactance and the time derivative of the line current.

The voltage sampled is then adjusted at step 56 so that the voltage sample is on the same time basis as the current sample. The adjusted voltage value $V'_m$ is determined in accordance with the following relationship:

$$v'_m = \frac{1}{\cos\left(\frac{\pi \cdot M}{N}\right)} \cdot \frac{(v_m + v_{m-M})}{2} \tag{4}$$

where:

$v_m$ = mth voltage sample; and $v'_m$ = mth compensated voltage sample.

Using the values $IX_m$ and $v'_m$ as determined in step 54, current and voltage phasor values are generated. The phasor values are generated in accordance with the following relationship:

$$P_l = \sum_{k=l-N+1}^{l} e^{\frac{-jk2\pi}{N}} \cdot x_k \qquad (5)$$

where:

$x_k$=the kth member of the sequence of sampled values of either voltage or current, and $P_l$=the lth phasor from a weighted sum of N samples, using complex weights.

Using the phasor values $P_l$ for the current samples, microcontroller 18 (FIG. 1) at step 60 determines, for example, whether a fault exists on the power lines supplying voltage signals $V_1$, $V_2$ and $V_3$ and current signals $I_1$, $I_2$ and $I_3$. Phasor values $P_l$ for the voltage samples can be used by microcontroller 18 for other diagnostic operations. If a fault is determined to exist, and as explained above, microcontroller 18 (FIG. 1) generates a signal that causes a circuit breaker (not shown) to trip. A utility worker, upon arriving at the site of controller 10 (FIG. 1), is able to obtain fault location information from controller 10.

The known decaying offset correction method described above is computationally burdensome. Specifically, and to determine the required values using discrete fourier transforms in the sequence described above, 2N multiplications and 2N additions per cycle per channel, i.e., for each complete phasor rotation, are performed. These extensive computations reduce the processor time available that could otherwise be used in performing other diagnostic tests.

In one aspect, the present invention separates the requirements of detecting existence of faults from the requirements of locating faults. More specifically, the decaying offsets do not necessarily have to be removed from the current phasors in order to determine whether a fault exists in the network. The decaying offsets need only be removed upon occurrence of some predetermined condition; e.g., upon identification of a fault condition, the decaying offsets need to be removed to use the current phasors to locate the fault. By reversing the order of process steps executed so that phasor values are generated and then, when needed, decaying offsets are removed from the generated phasor values, the computational burden can be significantly reduced in certain situations.

Figure 3:
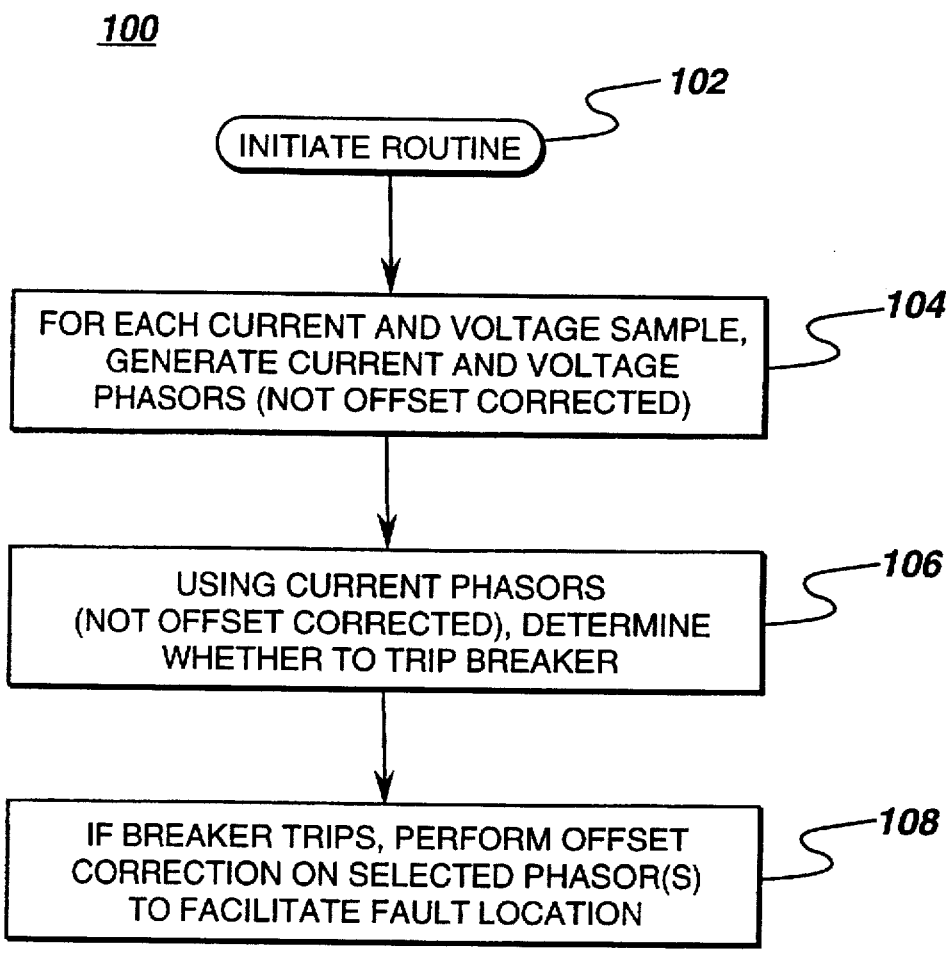
FIG. 3 is flow chart illustrating a decaying offset removal routine in accordance with one embodiment of the present invention.

More specifically, a routine 100 in accordance with one embodiment of the invention is illustrated in FIG. 3. Routine 100 can, for example, be embedded in the firmware of microcontroller 18 (FIG. 1). Once routine 100 is initiated at step 102, and for each current and voltage sample, current and voltage phasors are generated at step 104. Such phasors are generated, in one embodiment, in accordance with the following relationship:

$$P_l = \sum_{k=l-N+1}^{l} e^{\frac{-jk2\pi}{N}} \cdot x_k \qquad (6)$$

where:

$x_k$=the kth member of the sequence of sampled values of either voltage or current, and $P_l$=the lth phasor from a weighted sum of N samples, using complex weights.

The phasor values, which are not offset corrected, can then be used to determine whether to trip a breaker, for example, as indicated at step 106.

Once the breaker trips, it is necessary to remove the decaying offsets from the current phasors so that the fault location can be accurately identified. The current phasors and voltage phasors generated in accordance with relationship (6) can be offset corrected, in one embodiment, in accordance with the following relationship:

$$PM_l = A \cdot P_l + B \cdot e^{\frac{-j2M\pi}{N}} \cdot P_{l-M} \qquad (7)$$

where:

M=the interval, for k samples, used to approximate the mimic simulations, $PM_l$=the off set corrected phasor value for interval $M_1$, and N=sampling rate, samples per cycle.

$A = C + S, B = C - S,$ $$C = \frac{R}{2\cos\left(\frac{\pi M}{N}\right)}, S = \frac{X}{2\sin\left(\frac{\pi M}{N}\right)}, \text{FOR CURRENT}$$

$$C = \frac{1}{2\cos\left(\frac{\pi M}{N}\right)}, S = 0, \text{FOR VOLTAGE}.$$

The offset corrected current phasors, as indicated at step 108, can then be used to locate the fault.

In some operations, such as fault location, relationship (7) is executed only after a fault occurs. In other instances, such as some relaying applications, offset corrected phasors may be required at a periodic rate R. For large values of rate R, routine 50 (FIG. 2) has a computational advantage in that when rate R is large, fewer computations are required by routine 50. The break even point between routine 50 (FIG. 2) and routine 100 (FIG. 3) occurs, however, when 6R=2N, or when R=N/3. In other words, the break even point is when the requirements for an offset corrected phasor rate is ⅓ the sampling rate. In some relaying applications, N=64 and R=16, in which case routine 100 (FIG. 3) has a computational advantage. In other applications, such as transmission line digital current differential protection, where the ratio of R/N is even lower, routine 100 enjoys even a greater advantage.

The invention described above requires a reduced number of computations in at least some circumstances so that the controller processor is available to perform other diagnostic tests. In addition, performing such reduced number of computations is not believed to result in any less optimum operation of power distribution equipment than achieved by the known equipment.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for eliminating error in at least one measured current value of a power system current due to a decaying offset, comprising the steps of:

generating at least one current phasor value from the at least one measured current value; and upon occurrence of a predetermined condition, removing the decaying offset from the at least one generated current phasor value in accordance with a relationship:

$$PM_l = A \cdot P_l + B \cdot e^{\frac{-j2M\pi}{N}} \cdot P_{l-M}$$

where $M_1$=an interval, for k samples, used to approximate a mimic simulation, $PM_i$=an offset corrected phasor value for interval $M_i$.
N=sampling rate, samples per cycle.

$$A = C + S, B = C - S,$$

$$C = \frac{R}{2\cos\left(\frac{\pi M}{N}\right)}, S = \frac{X}{2\sin\left(\frac{\pi M}{N}\right)}.$$

2. A processor comprising:
- an analog-to-digital converter for converting analog input signals to digital signals, the analog input signals being representative of voltage and current values present on a power system; and
- a microcontroller coupled to an output of said converter, said microcontroller being programmed to generate at least one current phasor value from at least one of the power system current values, and to eliminate error in a generated current phasor value due to a decaying offset in current upon occurrence of a predetermined condition in accordance with a relationship:

$$PM_i = A \cdot P_i + B \cdot e^{\frac{-pM\pi}{N}} \cdot P_{i-M}$$

where:

$M_i$=an interval, for k samples, used to approximate a mimic simulation, $PM_i$=an offset corrected phasor value for interval $M_i$, and N=sampling rate, samples per cycle.

$$A = C + S, B = C - S,$$

$$C = \frac{R}{2\cos\left(\frac{\pi M}{N}\right)}, S = \frac{X}{2\sin\left(\frac{\pi M}{N}\right)}.$$

* * * * *